Figure 4:
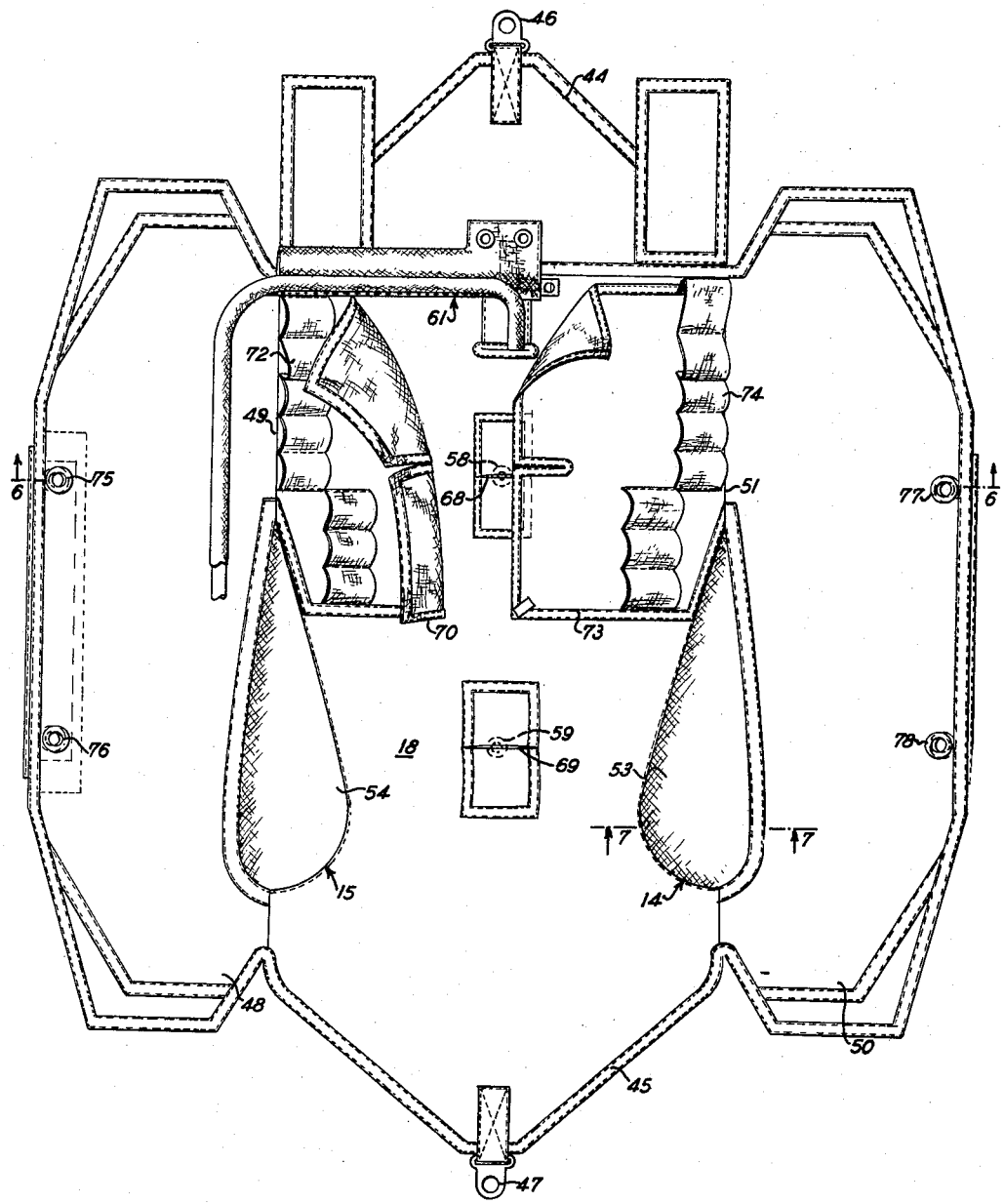

Jan. 9, 1962   O. W. SEPP, JR   3,016,218
FORM FITTING PARACHUTE PACK
Filed April 1, 1960   6 Sheets-Sheet 1
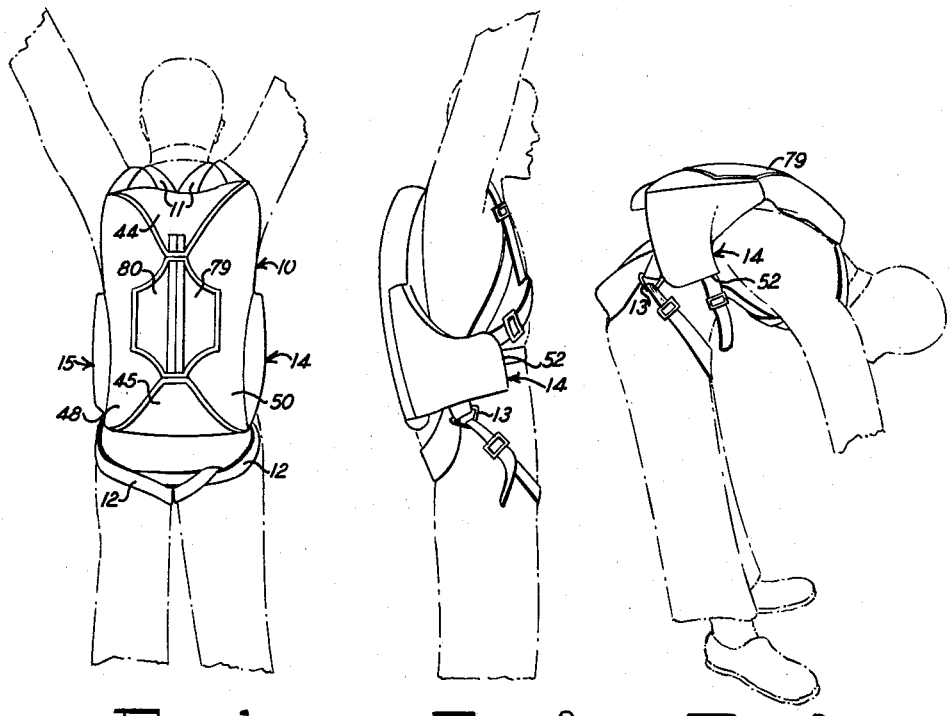
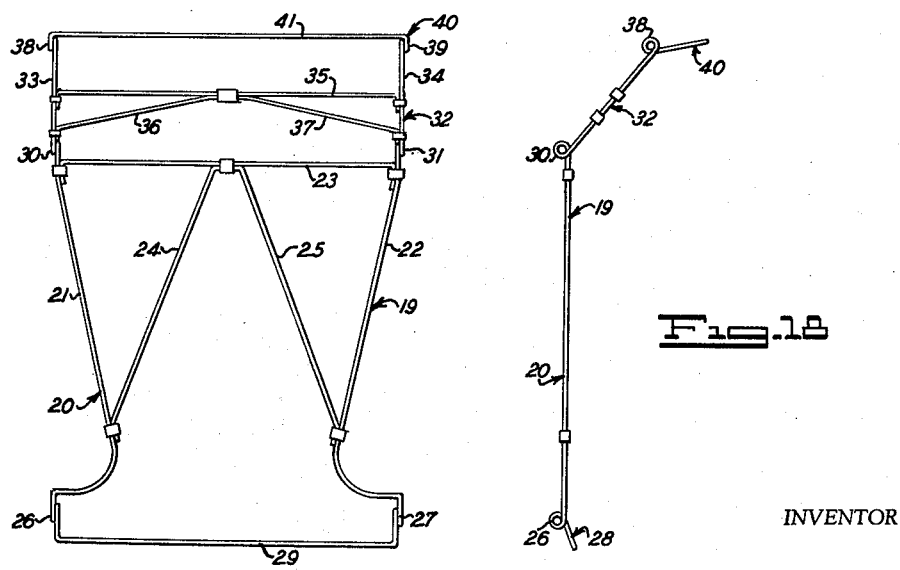
INVENTOR
OSCAR W. SEPP JR.
BY
ATTORNEYS Jan. 9, 1962 O. W. SEPP, JR 3,016,218
FORM FITTING PARACHUTE PACK
Filed April 1, 1960 6 Sheets-Sheet 2

INVENTOR.
OSCAR W. SEPP JR.
BY
ATTORNEYS

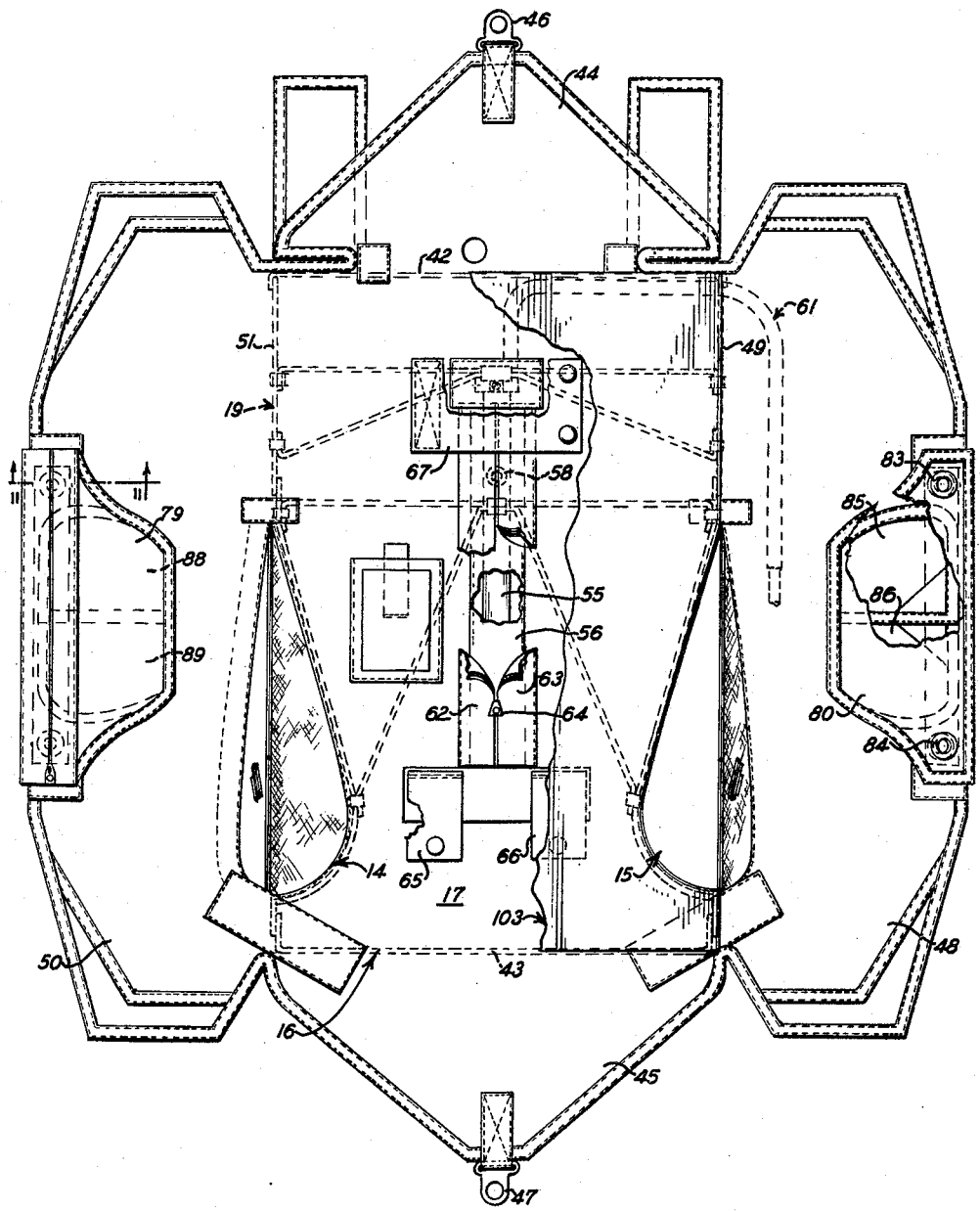

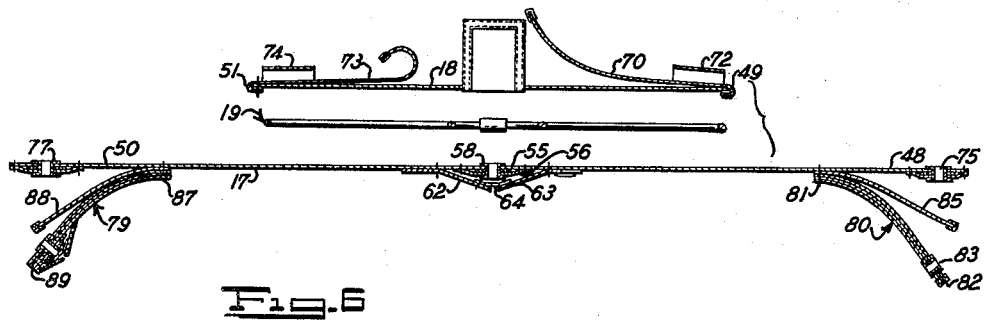
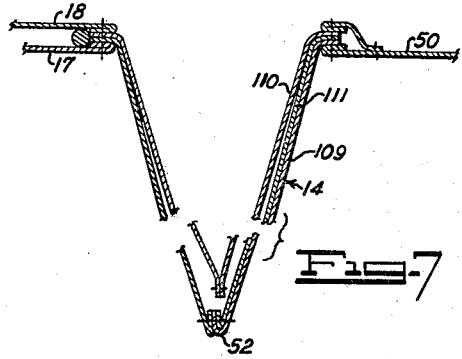
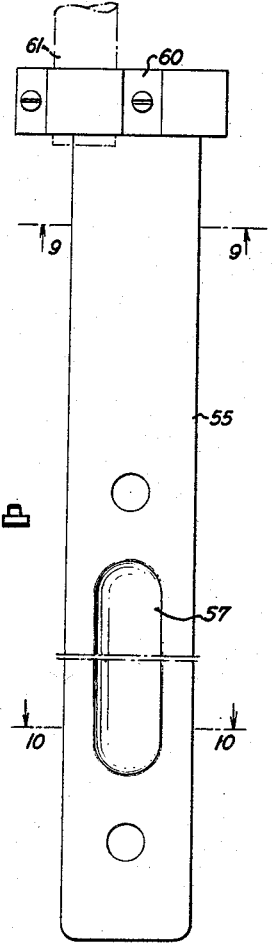
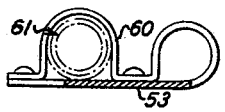
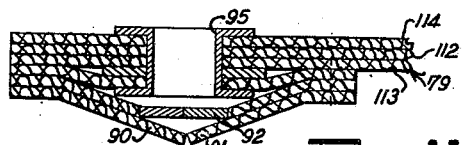
INVENTOR.
OSCAR W. SEPP JR.
ATTORNEYS Jan. 9, 1962     O. W. SEPP, JR     3,016,218
FORM FITTING PARACHUTE PACK
Filed April 1, 1960     6 Sheets-Sheet 5
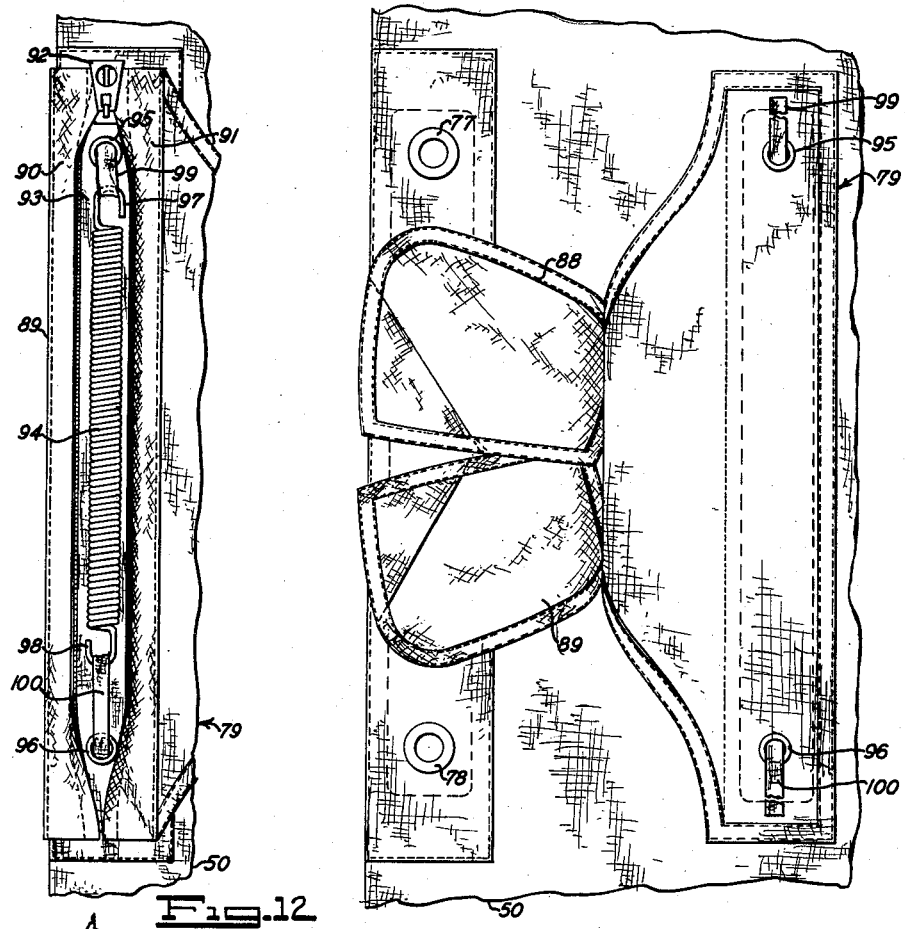
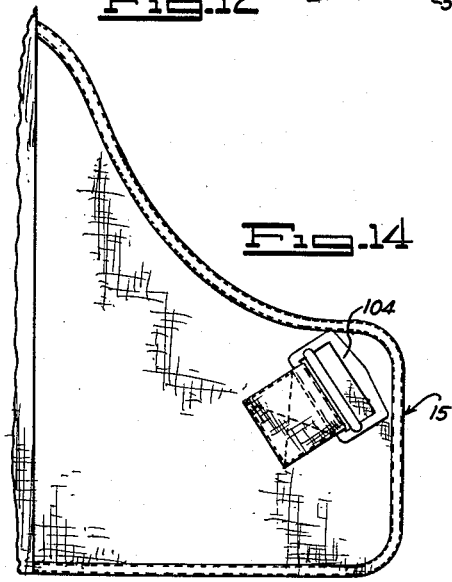
INVENTOR.
OSCAR W. SEPP JR.
BY
ATTORNEYS

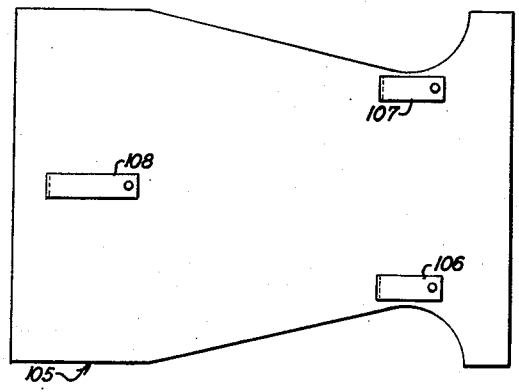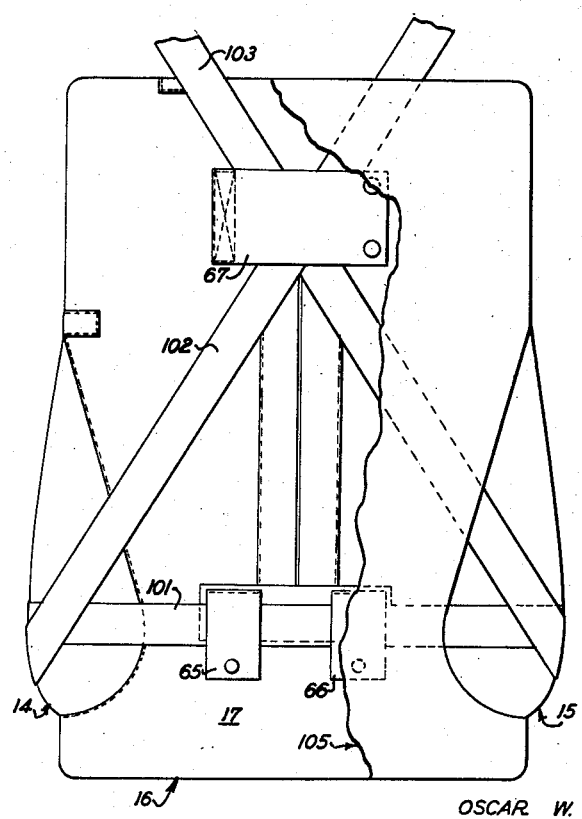

United States Patent Office 3,016,218
Patented Jan. 9, 1962

3,016,218
FORM FITTING PARACHUTE PACK
Oscar W. Sepp, Jr., Dayton, Ohio, assignor to M. Steinthal & Co., Inc., New York, N.Y., a corporation of New York
Filed Apr. 1, 1960, Ser. No. 19,250
6 Claims. (Cl. 244—148)

This invention relates to aeronautics and more particularly to a form fitting parachute pack for use by pilots or other personnel having occasion to ride in aircraft.

The parachute pack of this invention is designed for personnel use and is to be distinguished from parachute packs utilized for dropping material from parachute packs utilized in the deceleration of aircraft during landing operation, the latter being commonly known as drag chutes.

Heretofore, numerous types of parachute packs for personnel use have been proposed and utilized and among these are the back pack, the chest pack and the seat pack. All of these previous parachute packs have been relatively satisfactory insofar as the deployment of the parachute is concerned, but these types have left much to be desired in the matter of comfort and convenience. The back pack does not seriously interfere with normal movement of the user, but the same is quite uncomfortable, since when seated, the wearer is required to assume a rather unnatural position due to the relatively bulky package on the back and unless the seat in which the user is seated is specially designed to accommodate the back pack, the user experiences considerable discomfort and undue fatigue. While the chest pack is relatively comfortable during a standing or sitting position and does not impede walking movement of the wearer, nevertheless, this relatively bulky pack situated on the chest of the wearer seriously interferes with movement of the arms and consquently, the chest pack is not at all adapted for use by an aircraft pilot who must have free and relatively unrestricted use of his arms while in the air. Probably the most widely used parachute pack up to the present time, has been the so-called seat pack which is secured to the wearer by a harness and when in a standing position, hangs below the buttocks and is utilized as a seat cushion when seated. This type of pack, however, is extremely awkward and uncomfortable when walking and also tends to get in the way when entering or leaving an aircraft, particularly in fighter aircraft in which the pilots compartment is considerably restricted as to size. Furthermore, the seat pack is not of such a formation and configuration as to provide a particularly comfortable seat, with the result that over long periods of time, such a pack becomes quite uncomfortable and also contributes materially to fatigue of the user.

Obviously, the ideal parachute pack for use by personnel would be one which, when worn by the user, would not in anyway impede normal movements, such as walking or movement of the arms, and also one which would be entirely comfortable and would not cause the user to assume an unnatural position or require extensive modification of seating arrangements in order to properly accommodate the parachute pack. This invention attempts to attain this ideal by providing a parachute pack which is form fitting, or in other words, substantially conforms to the person using the same to which the pack is applied and also the thickness or bulk of the pack has been materially reduced by a novel design which permits packing of the parachute in such a manner as to require a minimum thickness of the pack to accommodate the entire parachute, as well as the pilot chute. As a result, the parachute pack of this invention does not in anyway impede walking movements of the user and also does not impede normal movement of the arms, thereby permitting the pack to be utilized by pilots or other personnel who, by reason of using this pack, may be seated in a normal and comfortable position.

It is accordingly an object of the invention to provide a form fitting parachute pack which may be worn on the back of the user and which will conform to the contour of the back in such a manner as to be comfortable and to not impede normal movements of the arms or legs of the wearer.

A further object of the invention is the provision of a form fitting parachute pack incorporating a wire frame having portions yieldably connected in such a manner as to permit normal movements of the wearer, but at the same time causing the pack to conform substantially to the contour of the back of the wearer.

A still further object of the invention is the provision of a form fitting parachute pack so designed as to accommodate and contain a conventional parachute and pilot chute while providing a pack of minimum thickness and bulk.

Another object of the invention is the provision of a form fitting parachute pack in which an additional yieldable pad may be disposed between the pack and the back of the wearer in order to contribute to the comfort of the wearer.

A further object of the invention is the provision of a form fitting parachute pack in which a portion of the parachute is contained in the pack on the back of the wearer and in which other portions of the parachute are contained in sleeves attached to the side edges of the pack and extending forwardly and under the arms of the wearer.

A still further object of the invention is the provision of a form fitting parachute pack which is of unitary construction and which may be conveniently opened to expose the entire area thereof, thereby facilitating packing of a parachute therein.

Another object of the invention is the provision of a form fitting parachute pack incorporating means for receiving and housing a rip cord assembly.

A further object of the invention is the provision of a form fitting parachute pack having a generally rectangular body portion, together with side flaps and top and bottom flaps which may be folded over the body to provide a compartment for receiving a parachute there being auxiliary flaps on the side flaps which may be folded over to provide a second compartment for receiving a pilot chute.

Another object of the invention is the provision of a form fitting parachute pack, including a generally rectangular body portion having side flaps and top and bottom flaps attached thereto, such flaps being foldable over the body portion to provide a compartment for receiving a parachute, there being auxiliary flaps attached to the side flaps which may be folded over to provide a second compartment for receiving a pilot chute, there being common means provided for retaining the flaps forming the pilot chute compartment, the side flaps and the top and bottom flaps in folded condition, such means cooperating with the rip cord assembly to releasably retain the parachute and pilot chute in the pack.

A further object of the invention is the provision of a form fitting parachute pack having means for attaching the same to a harness which in turn secures the pack, as well as the risers of a parachute to the wearer.

A still further object of the invention is the provision of a form fitting parachute pack having one compartment for receiving a parachute and a second compartment for receiving a pilot chute and in which means is provided in the parachute compartment for releasably retaining the risers of the parachute in a manner to prevent entanglement during deployment of such parachute.

Another object of the invention is the provision of a form fitting parachute pack which may be conveniently and economically manufactured from readily available fabric material or other suitable fabrics and in which suitable metallic reinforcing means are provided at points of strain, the pack being designed in such a manner as to present a smooth outward appearance free from bulges or projections.

A further object of the invention is the provision of a form fitting parachute pack so designed as to completely open upon actuation of the rip cord assembly, thereby exposing the entire pilot chute and parachute to materially facilitate deployment of the parachute thereby appreciably reducing the danger of parachute failure.

Further objects and advantages of the invention will be apparent from the following description taken in conjunction with the accompanying drawings wherein:

FIG. 1 is a rear view in elevation showing the form fitting parachute pack of this invention in position on the back of the user;

FIG. 2 a side elevational view showing the parachute pack in position on the back of the user;

FIG. 3 a side elevational view showing the user in a bent over position and illustrating the manner in which the form fitting parachute pack of this invention permits completely unimpeded movement of the user;

FIG. 4 a plan view of the rear side of the parachute pack of this invention with the side flaps and top and bottom flaps open to show the interior structure of the pack;

FIG. 5 a view similar to FIG. 4, but showing the front side of the parachute pack and with the forming supporting wire frame shown in dotted outline;

FIG. 6 a sectional view taken substantially on the line 6—6 of FIG. 4 and showing the relationship of the front and rear panels forming the body of the pack, as well as the side flaps and the disposition of the form retaining wire frame;

FIG. 7 a fragmentary sectional view taken substantially on the line 7—7 of FIG. 4 and showing the structure of one of the parachute receiving sleeves;

FIG. 8 an elevational view showing the reinforcing and retaining means for receiving the rip cord assembly;

FIG. 9 a sectional view taken substantially on the line 9—9 of FIG. 8;

FIG. 10 a sectional view taken substantially on the line 10—10 of FIG. 8;

FIG. 11 a fragmentary sectional view taken substantially on the line 11—11 of FIG. 5 and showing the structure of the pocket on one side flap for receiving a tension spring which cooperates with the rip cord assembly;

FIG. 12 a fragmentary elevational view showing the pocket in one of the auxiliary flaps, together with the tension spring disposed therein for cooperation with the rip cord assembly;

FIG. 13 a fragmentary elevational view showing the manner in which one of the auxiliary flaps provides a portion of the compartment for receiving the pilot chute;

FIG. 14 a fragmentary elevational view showing one of the parachute receiving sleeves, together with the buckle means thereon for securing the sleeve in position on the wearer;

FIG. 15 a plan view of the removable yieldable pad utilized to provide additional comfort for the wearer;

FIG. 16 a plan view of the front of the parachute pack showing the yieldable pad in place, but with a portion thereof broken away to more clearly show the structure and the manner of attaching the pack to a harness;

FIG. 17 a front elevational view of the form retaining metallic wire frame utilized to maintain the shape of the form fitting pack of this invention; and FIG. 18 a side elevational view of the frame shown in FIG. 17.

With continued reference to the drawing, there is shown in FIGS. 1, 2 and 3 a form fitting parachute pack 10 constructed in accordance with this invention and applied to the back of a wearer. A more or less conventional parachute harness is utilized having shoulder straps 11 and straps 12 which extend between the legs of the wearer, the straps 11 and 12 as shown in FIG. 2, being secured to the body of the wearer by suitable buckles or other fastening means 13 disposed at appropriate locations on the harness. The harness is also secured to the pack 10 in a manner to be later described. As clearly shown in FIGS. 2 and 3, the pack 10 is provided with sleeves 14 and 15 extending from opposite side edges of the pack 10 and projecting forwardly around the body of the user under the arms and as clearly shown in FIG. 3, the pack, as well as the sleeves 14 and 15 are disposed in such a manner as to provide comfort for the wearer and, at the same time, this pack does not impede the normal movements of the legs or arms of the wearer. As will be seen, the pack closely conforms to the contour of the back of the wearer from above the shoulder blades to below the buttocks and the rear surface of the pack is substantially smooth and unimpeded by projections or bulges, thereby permitting the user to sit in a conventional seat without being placed in an unnatural position and with full comfort. Furthermore, the structure and configuration of the pack permits full and complete movement of the arms and legs of the user, thereby permitting use of this pack by a pilot or other occupant of an aircraft who must, in the performance of his duties, either move about or move his legs and arms while wearing the parachute pack.

With particular reference to FIGS. 4, 5 and 6, the parachute pack 10 may well comprise a body 16 consisting of a front generally rectangular fabric panel 17 and a rear generally rectangular fabric panel 18 secured together along the top, bottom and side edges to provide a closed pocket for receiving a generally rectangular metallic wire frame 19.

As best shown in FIGS. 17 and 18, the wire frame 19 is provided with a substantially straight central portion 20 composed of wires 21 and 22 which diverge upwardly and outwardly and are connected adjacent their upper ends by a cross wire 23. Diagonal brace wires 24 and 25 extend from substantially the center of the cross wire 23 to the side wires 21 and 22 adjacent the lower ends thereof. The side wires 21 and 22 are so shaped as not to interfere with the parachute receiving sleeves 14 and 15 as clearly shown in dotted outline in FIG. 5.

The side wires 21 and 22 extend downwardly and are connected by spring loops 26 and 27 with a forwardly and downwardly extending bottom portion 28 which terminates in a bottom cross wire 29. The central portion 20 of the frame 19 at the upper end connects through yieldable spring loops 30 and 31 with an upwardly and forwardly extending intermediate portion 32 composed of side wires 33 and 34 connected by a cross wire 35 and suitably braced by diagonal brace wires 36 and 37 extending from substantially the midpoint of the cross wire 35 to the side wires 33 and 34. The intermediate portion 32 terminates at the upper end in yieldable spring loops 38 and 39 which connect the same to a forwardly and upwardly extending top portion 40 which in turn terminates in a top cross wire 41. The spring loops 38 and 39 permit the top portion 40 to move with relation to the intermediate portion 32 and the spring loops 30 and 31 permit the intermediate portion 32, as well as the top portion 40 to move with relation to the central portion 20 and the spring loops 26 and 27 permit the bottom portion 28 to move with relation to the central portion 20. With the frame 19 disposed in the pocket between the front panel 17 and rear panel 18, the pack is given a configuration similar to that shown in FIG. 18 and generally conforms to the contour of the back of the user from above the shoulder blades to below the buttocks. In this manner the shape of the pack is maintained which materially contributes to convenience in applying the same to the wearer, as well as to the comfort of the wearer and also retains the pack in shape which materially facilitates packing a parachute therein.

The front panel 17 extends upwardly and downwardly from the upper and lower edges 42 and 43 respectively of the body 16 to provide a generally triangular top flap 44 and a generally triangular bottom flap 45. A ring 46 is secured to the top flap 44 adjacent the apex thereof and a similar ring 47 is secured to the bottom flap 45 adjacent the apex thereof. The purpose and operation of flaps 44 and 45, as well as the rings 46 and 47 will be later described. A generally rectangular side flap 48 is secured to the body 16 along one side edge 49 and a second generally rectangular side flap 50 is secured to the body 16 along the opposite side edge 51. The side flaps 48 and 50, as well as the top and bottom flaps 44 and 45 are foldable over the rear panel 18 of the body 16 to provide a compartment for receiving a parachute in a manner to be later described.

The sleeves 14 and 15 are closed at their forward ends 52 as clearly shown in FIG. 2, and such sleeve 14 is secured to the front panel 17 and to the side flap 50 generally along the side edge 51 of the body 16, as clearly shown in FIG. 5. In a similar manner, the sleeve 15 is secured to the front panel 17 and to the side flap 48 generally along the side edge 49 of the body 16 also as clearly shown in FIG. 5. With particular reference to FIG. 4, it will be seen that the sleeve 14 is provided with an opening 53 in the rear panel 18 and in a similar manner, the sleeve 15 is provided with an opening 54 in the rear panel 18. In this manner, the sleeves 14 and 15 are closed at the forward ends 52, but are open at the rear, as clearly shown in FIG. 4. The purpose and use of these sleeves will be later described. As will be noted from an inspection of FIGS. 4 and 5, the sleeves 14 and 15 extend from adjacent the bottom edge 43 of the body 16 to a point above the midpoint of the body 16 and as clearly shown in FIGS. 2 and 3, the sleeves 14 and 15 taper forwardly and downwardly in order to extend under the arms of the wearer in such a manner as to not impede movement of the arms and also to provide a comfortable fit.

A vertically disposed generally rectangular metallic reinforcing plate 55 is secured to the front panel 17 centrally thereof, by means of an overlying strip of material 56 which is sewed or otherwise secured to the front panel 17 and as best shown in FIG. 8, the plate 55 is provided with a forwardly facing longitudinal channel 57, the purpose of which will presently appear. An eyelet 58 is provided in the front panel 17 and plate 55 adjacent the upper end of the plate and a similar eyelet 59 is provided in the front panel 17 and plate 55 adjacent the lower end of the plate. Also provided at the upper end of the plate 55 is a clamping means 60 for securing the end of a rip cord assembly 61 to the plate 55. As best shown in FIGS. 5 and 6, opposed tapes 62 and 63 are secured to the front panel 17 and slide fastener means 64 is provided for closing the tapes over the plate 55 to provide a pocket for receiving a portion of the rip cord assembly. The front panel 17 is also provided with releasable strap means 65, 66 and 67 to facilitate attachment of the pack to a parachute harness in a manner to be later described.

The rear panel 18 is provided with apertures 68 and 69 in alignment with the eyelets 58 and 59 respectively and secured to the body 16 along the side edge 49 and adjacent the upper portion thereof is a flap 70 which overlies the rear panel 18 and the flap 70 is provided with a series of fabric loops 72 secured thereto, to releasably receive a folded parachute riser. In a similar manner, a flap 73 is secured along the side edge 51 of the rear panel 18 adjacent the upper portion thereof and substantially in alignment with the flap 70 and the flap 73 is provided with a series of loops 74 for releasably receiving another folded parachute riser. The side flap 48 is provided with spaced eyelets 75 and 76 and the side flap 50 is likewise provided with spaced eyelets 77 and 78.

A parachute is folded in such a manner that portions of such parachute are received in the sleeves 14 and 15 and the remainder of the parachute is disposed over the rear panel 18 with the risers folded and received in the loops 72 and 74 on the flaps 70 and 73. The side flaps 48 and 50, as well as the top and bottom flaps 44 and 45 respectively are folded over the parachute to provide a compartment for receiving the same and in this position, the eyelets 58, 75 and 77, as well as the ring 46 on the top flap 44 are in alignment and in a similar manner, the eyelets 59, 76 and 78, as well as the ring 47 on the bottom flap 45 are in alignment. The flaps are releasably retained in this position in a manner to be later described.

Since a pilot chute is normally utilized to pull the main parachute from the pack, there has also been provided in the pack of this invention means forming a second compartment for receiving such pilot chute. This second compartment for receiving the pilot chute is formed by auxiliary flaps 79 and 80 secured to the side flaps 50 and 48 respectively and as best shown in FIGS. 5 and 6, auxiliary flap 80 is secured to the side flap 48 by a line of stitching 81 and with the outer edge 82 of the auxiliary flap 80 remaining free. The auxiliary flap 80 is provided with eyelets 83 and 84 in alignment with the eyelets 75 and 76 in the side flap 48. Disposed between the auxiliary flap 80 and the side flap 48 are a pair of flaps 85 and 86 which cooperate with the auxiliary flap 80 in retaining the pilot chute in place.

In a similar manner, the auxiliary flap 79 is secured to the side flap 50 by a line of stitching 87 and a pair of flaps 88 and 89 are disposed between the auxiliary flap 79 and the side flap 50 to cooperate in providing a compartment for receiving the pilot chute. It is to be noted, that the auxiliary flaps 79 and 80 are considerably smaller than the side flaps 48 and 50 and this, of course, is occasioned by the fact that it is only necessary for the auxiliary flaps 79 and 80 to provide a compartment and cover the pilot chute which is of considerably smaller size than the main chute which is covered by the side flaps 48 and 50 and the top and bottom flaps 44 and 45.

As best shown in FIGS. 6 and 12, the outer edge 89 of the auxiliary flap 79 is free and secured to this auxiliary flap 79 adjacent the edge 89 are opposed tapes 90 and 91 which may be closed by a slide fastener 92 to provide a pocket 93 for receiving a tension spring 94. The channel 57 in the plate 55 serves to provide space for receiving the spring 94. Eyelets 95 and 96 are provided in the auxiliary flap 79, such eyelets opening into the pocket 93 and being disposed in alignment with the eyelets 77 and 78 in the side flap 50.

The tension spring 94 is provided with hooked ends 97 and 98 which serve to engage tapes 99 and 100, such tapes extending through the eyelets 95 and 96. With the side flaps 48 and 50 and the top and bottom flaps 44 and 45 folded over the rear panel 18 to provide a compartment for receiving the main parachute and with the auxiliary flaps 79 and 80 folded over the side flaps 50 and 48 respectively to provide a compartment for receiving the pilot chute, all of the eyelets are in alignment and the tape 99 extends through the eyelet 77 in the side flap 50, the eyelet 75 in the side flap 48, the aperture 68 in the rear panel 18 and the eyelet 58 in the front panel 17 where the end of such tape 99 is engaged by a portion of the rip cord assembly 61 which extends therethrough. In a similar manner, the tape 100 extends through the eyelet 78 in the side flap 50, the eyelet 76 in the side flap 48, the aperture 69 in the rear panel 18 and the eyelet 59 in the front panel 17, the end of the tape 100 likewise being engaged by a portion of the rip cord assembly 61 which extend therethrough. This operates to retain all of the flaps in position until such time as the rip cord assembly is actuated to withdraw the same and release the tapes 99 and 100, at which time the auxiliary flaps 79 and 80 will open to release the pilot chute contained thereby and at the same time, the side flaps 48 and 50, as well as the top and bottom flaps 44 and 45 will open to release the main parachute and permit the same to be deployed from the pack by the pulling action of the pilot chute. The tension spring 94 places a tension on the tapes 99 and 100 to prevent inadvertent release thereof from the rip cord mechanism, but such tension is not sufficient to impede convenient and normal operation of the rip cord assembly the structure of which is substantially conventional.

With particular reference to FIGS. 16 and 14, it will be seen that the body 16 of the parachute pack of this invention may be releasably secured to a parachute harness by passing a strap 101 of the harness through the tabs or straps 65 and 66 secured to the front panel 17 of the body 10 and also by passing the crossed straps 102 and 103 through the tab or strap 67 secured to the front panel 17 of the body 16. Also provided on the sleeves 14 and 15, as shown in FIG. 14, is a buckle 104 which serves to receive a strap, not shown, of the parachute harness to retain the sleeves 14 and 15 in the position shown in FIGS. 1 to 3.

In order to increase the comfort of the wearer, there is shown in FIG. 15 a yieldable pad 105 which may be formed of suitable fabric and filled with a yieldable material, such as foam rubber or the like, and such pad is provided on the rear surface thereof with releasable tabs 106, 107 and 108 which may be utilized to secure the pad 105 in place over the front panel 17 with the tabs 106 and 107 engaging the harness strap 101 and with the tab 108 engaging the tab or strap 67 on the front panel 17. In this manner, the pad 105 may be conveniently installed or removed and when in place, will provide considerable additional comfort for the wearer, since such pad covers the harness straps, as well as various structural features of the pack which might project forwardly and cause discomfort to the wearer. The pad 105 is shown broken away in FIGS. 5 and 16 which clearly illustrates the manner in which the same is utilized.

Any desirable or suitable material, such as nylon, may be utilized in constructing the parachute pack of this invention and where desirable or necessary, stiffening layers may be employed and with particular reference to FIG. 7, it will be seen that the sleeves 14 and 15 are constructed by utilizing an outer layer 109 of fabric which is relatively tough and resistant to wear, an inner layer 110 which may be relatively soft and flexible and an intermediate layer 111 of any suitable material which is relatively stiff and which will serve to maintain the desired shape of the sleeves 14 and 15. In a similar manner as shown in FIG. 11, a stiffening layer 112 may be disposed between the layers of material 113 and 114 forming the auxiliary flap 79 and in this manner, suitable rigidity will be provided.

It will be seen that by the above described invention there has been provided a form fitting parachute pack which may be conveniently utilized by aircraft personnel to carry parachutes at all times and in such a manner as not to impede normal walking movement or to impede the movement of the arms in performing their duties and furthermore, the parachute pack of this invention is of minimum size and bulk and does not cause any material discomfort to the wearer. The parachute pack of this invention may be fully opened to materially facilitate packing of both the main parachute and the pilot chute within the same and while the pack is provided with a configuration or contour normally conforming to the back of the wearer, nevertheless, the wire frame which provides such contour is yieldable thereby permitting movement of the wearer without experiencing discomfort and also adapting the pack to wearers having different back configurations or contours.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A form fitting parachute pack comprising a body consisting of front and rear generally rectangular fabric panels secured together along the top, bottom and side edges to provide a closed pocket, a generally rectangular metallic wire frame received in said pocket, said frame having a substantially straight central portion, a forwardly and downwardly extending bottom portion yieldably connected to the bottom of said central portion, a forwardly and upwardly extending intermediate portion yieldably connected to the top of said central portion and a forwardly and upwardly extending top portion yieldably connected to the top of said intermediate portion, said frame serving to provide said body with a yieldable contour substantially conforming to the back of a person from above the shoulder blades to below the buttocks, said front panel extending upwardly and downwardly from the top and bottom edges of said body to provide generally triangular top and bottom flaps, a ring secured to said top flap adjacent the apex and a ring secured to said bottom flap adjacent the apex, a generally rectangular side flap secured to said body along one side edge, a second generally rectangular side flap secured to said body along the opposite side edge, a sleeve closed at the forward end and secured to said body and one side flap along the seam between said body and said one side flap, a second sleeve closed at the forward end and secured to said body and said second side flap along the seam between said body and said second side flap, said sleeve opening to the rear of said body, said sleeve extending from adjacent the bottom edge of said body to a point above the midpoint of said body and tapering forwardly and downwardly, a vertically disposed generally rectangular metallic reinforcing plate secured to said front panel centrally thereof, a forwardly facing longitudinal channel in said plate, an eyelet in said front panel and plate adjacent the upper and lower ends of said plate, means for securing the end of a rip cord assembly to the upper end of said plate, opposed tapes secured to said front panel, slide fastener means for connecting said tapes together forwardly of said front panel to cover a portion of said rip cord assembly, said rear panel having apertures in alignment with said eyelets, said first and second side flaps and said top and bottom flaps being foldable over said rear panel to provide a compartment adapted to receive a folded parachute with a portion of the parachute disposed in said sleeves, means within the upper portion of said compartment adapted to releasably receive folded parachute risers, spaced eyelets in said side flaps, an auxiliary flap of reduced size secured along one edge to the rear surface of said first side flap, a second auxiliary flap of reduced size secured along one edge to the rear surface of said second side flap, said auxiliary flaps being foldable over said side flaps, to provide a second compartment adapted to receive a folded pilot chute, spaced eyelets in said first auxiliary flap, an elongated pocket on the rear surface of said second auxiliary flap closed by a slide fastener, spaced eyelets in said second auxiliary flap opening into said last named pocket, a tension spring disposed in said last named pocket, the eyelets in said auxiliary flap, said side flaps and said front panel, the apertures in said rear panel and the rings on said top and bottom flaps being in alignment when said flaps are folded over a parachute and pilot chute, flexible means extending through said eyelets and apertures and engaging the ends of said tension spring and releasably engaging the rip cord assembly to releasably retain said flaps in said folded condition and means on said pack for attaching the same to a parachute harness.

2. A form fitting parachute pack as defined in claim 1 including a yieldable pad secured over the front surface of said front panel for engaging the back of the wearer to provide added comfort.

3. A form fitting parachute pack comprising a body consisting of front and rear generally rectangular fabric panels secured together along the top, bottom and side edges to provide a closed pocket, a generally rectangular metallic wire frame received in said pocket, said frame having a substantially straight central portion, a forwardly and downwardly extending bottom portion yieldably connected to the bottom of said central portion, a forwardly and upwardly extending intermediate portion yieldably connected to the top of said central portion and a forwardly and upwardly extending top portion yieldably connected to the top of said intermediate portion, said frame serving to provide said body with a yieldable contour substantially conforming to the back of a person from above the shoulder blades to below the buttocks, said front panel extending upwardly and downwardly from the top and bottom edges of said body to provide generally triangular top and bottom flaps, a ring secured to said top flap adjacent the apex and a ring secured to the bottom flap adjacent the apex, a generally rectangular side flap secured to said body along one side edge, a second generally rectangular side flap secured to said body along the opposite side edge, a sleeve closed at the forward end and secured to said body and one side flap along the seam between said body and said one side flap, a second sleeve closed at the forward end and secured to said body and said second side flap along the seam between said body and said side flap, said sleeves opening to the rear of said body, said sleeves extending from adjacent the bottom edge of said body to a point above the midpoint of said body and tapering forwardly and downwardly, a vertically disposed generally rectangular metallic reinforcing plate secured to said front panel centrally thereof, an eyelet in said front panel and plate adjacent the upper and lower ends of said plate, means for securing the end of a rip cord assembly to the upper end of said plate, opposed tapes secured to said front panel, slide fastener means for connecting said tapes together forwardly of said front panel to cover a portion of said rip cord assembly, said rear panel having apertures in alignment with said eyelets, said first and second side flaps and said top and bottom flaps being foldable over said rear panel to provide a compartment adapted to receive a folded parachute with a portion of the parachute disposed in said sleeves, means within the upper portion of said compartment adapted to releasably receive folded parachute risers, spaced eyelets in said side flaps, an auxiliary flap secured to the rear surface of said front first side flap, a second auxiliary flap secured to the rear surface of said second side flap, said auxiliary flaps being foldable over said side flaps to provide a second compartment adapted to receive a folded pilot chute, spaced eyelets in said first auxiliary flap, an elongated pocket on the rear surface of said second auxiliary flap closed by a slide fastener, spaced eyelets in said second auxiliary flap opening into said last named pocket, resilient means disposed in said last named pocket, the eyelets in said auxiliary flaps, said side flaps and said front panel, the apertures in said rear panel and the rings on said top and bottom flaps being in alignment when said flaps are folded over a parachute and pilot chute, flexible means extending through said eyelets and apertures and engaging said resilient means and releasably engaging the rip cord assembly to releasably retain said flaps in folded condition and means on said pack for attaching the same to a parachute harness.

4. A form fitting parachute pack comprising a body consisting of front and rear generally rectangular fabric panels secured together along the top, bottom and side edges to provide a closed pocket, a generally rectangular metallic wire frame received in said pocket, said frame having a substantially straight central portion, a forwardly and downwardly extending bottom portion yieldably connected to the bottom of said central portion, a forwardly and upwardly extending intermediate portion yieldably connected to the top of said central portion and a forwardly and upwardly extending top portion yieldably connected to the top of said intermediate portion, said frame serving to provide said body with a yieldable contour substantially conforming to the back of a person from above the shoulder blades to below the buttocks, said front panel extending upwardly and downwardly from the top and bottom edges of said body to provide generally triangular top and bottom flaps, a ring secured to said top flap adjacent the apex and a ring secured to said bottom flap adjacent the apex, a generally rectangular side flap secured to said body along one side edge, a second generally rectangular side flap secured to said body along the opposite side edge, a sleeve closed at the forward end and secured to said body, a second sleeve closed at the forward end and secured to said body, said sleeves opening to the rear of said body, a vertically disposed generally rectangular metallic reinforcing plate secured to said front panel centrally thereof, an eyelet in said front panel and plate adjacent the upper and lower ends of said plate, means for securing the end of a rip cord assembly to the upper end of said plate, opposed tapes secured to said front panel, slide fastener means for connecting said tapes together forwardly of said front panel to cover a portion of said rip cord assembly, said rear panel having apertures in alignment with said eyelets, said first and second side flaps and said top and bottom flaps being foldable over said rear panel to provide a compartment adapted to receive a folded parachute with a portion of the parachute disposed in said sleeves, means within the upper portion of said compartment to releasably receive folded parachute risers, spaced eyelets in said side flaps, an auxiliary flap secured to the rear surface of said first side flap, a second auxiliary flap secured to the rear surface of said second side flap, said auxiliary flaps being folded over said side flaps to provide a second compartment adapted to receive a folded pilot chute, spaced eyelets in said first auxiliary flap, an elongated pocket on the rear surface of said second auxiliary flap closed by a slide fastener, spaced eyelets in said second auxiliary flap opening into said last named pocket, resilient means disposed in said last named pocket, the eyelets in said auxiliary flaps, said side flaps and said front panel, the apertures in said rear panel and the rings on said top and bottom flaps being in alignment when said flaps are folded over a parachute and pilot chute, flexible means extending through said eyelets and apertures and engaging said resilient means and releasably engaging the rip cord assembly to releasably retain said flaps in folded condition and means on said pack for attaching the same to a parachute harness.

5. A form fitting parachute pack comprising a body consisting of front and rear generally rectangular fabric panels secured together along the top, bottom and side edges to provide a closed pocket, a generally rectangular metallic wire frame received in said pocket, said frame having a substantially straight central portion, a forwardly and downwardly extending bottom portion yieldably connected to the bottom of said central portion, a forwardly and upwardly extending intermediate portion yieldably connected to the top of said central portion and a forwardly and upwardly extending top portion yieldably connected to the top of said intermediate portion, said frame serving to provide said body with a yieldable contour substantially conforming to the back of a person from above the shoulder blades to below the buttocks, said front panel extending upwardly and downwardly in the top and bottom edges of said body to provide generally triangular top and bottom flaps, a ring secured to said top flap adjacent the apex and a ring secured to said bottom flap adjacent the apex, a generally rectangular side flap secured to said body along one side edge, a second generally rectangular side flap secured to said body along the opposite side edge, a sleeve closed at the forward end and secured to said body, a second sleeve closed at the forward end and secured to said body, said sleeves opening to the rear of said body, a reinforcing means secured to said front panel centrally thereof, eyelets in said front panel and reinforcing means, means for securing the end of a rip cord assembly to said reinforcing means, opposed tapes secured to said front panel, slide fastener means for connecting said tapes together forwardly of said front panel to cover a portion of said rip cord assembly, said rear panel having apertures in alignment with said eyelets, said first and second side flaps and said top and bottom flaps being foldable over said rear panel to provide a compartment adapted to receive a folded parachute with a portion of the parachute disposed in said sleeves, spaced eyelets in said side flaps, an auxiliary flap secured to the rear surface of said first side flap, a second auxiliary flap secured to the rear surface of said second side flap, said auxiliary flaps being foldable over said side flaps to provide a second compartment and adapted to receive a folded pilot chute, spaced eyelets in said first auxiliary flap, an elongated pocket on the rear surface of said second auxiliary flap closed by a slide fastener, spaced eyelets in said second auxiliary flap opening into said last named pocket, resilient means disposed in said last named pocket, the eyelets in said auxiliary flaps, said side flaps and said front panel, the apertures in said rear panel and the rings on said top and bottom flaps being in alignment when said flaps are folded over a parachute and pilot chute, flexible means extending through said apertures and engaging said resilient means and releasably engaging the rip cord assembly to releasably retain said flaps in folded condition and means on said pack for attaching the same to a parachute harness.

6. A form fitting parachute pack comprising a body consisting of front and rear generally rectangular panels secured together along the top, bottom and side edges to provide a closed pocket, a generally rectangular metallic wire frame received in said pocket, said frame having a substantially straight central portion, a forwardly and downwardly extending bottom portion yieldably connected to the bottom of said central portion, a forwardly and upwardly extending intermediate portion yieldably connected to the top of said central portion and a forwardly and upwardly extending top portion yieldably connected to the top of said intermediate portion, said frame serving to provide said body with a yieldable contour conforming to the back of a person from above the shoulder blades to below the buttocks, said front panel extending upwardly and downwardly from the top and bottom edges of said body to provide top and bottom flaps, a ring secured to said top flap and a ring secured to said bottom flap, a side flap secured to said body along one side edge, a second side flap secured to said body along said opposite side edge, a sleeve closed at the forward end and secured to said body, a second sleeve closed at the forward end and secured to said body, said sleeves opening to the rear of said body, a reinforcing means secured to said front panel centrally thereof, eyelets in said front panel and reinforcing means, means for securing a rip cord assembly to said reinforcing means, means to cover a portion of said rip cord assembly, said rear panel having apertures in alignment with said eyelets, said first and second side flaps and said top and bottom flaps being foldable over said rear panel to provide a compartment adapted to receive a folded parachute with a portion of the parachute disposed in said sleeves, spaced eyelets in said side flaps, an auxiliary flap secured to the rear surface of said first side flap, a second auxiliary flap secured to the rear surface of said second side flap, said auxiliary flaps being foldable over said side flaps to provide a second compartment adapted to receive a folded pilot chute, spaced eyelets in said first auxiliary flap, an elongated pocket on the rear surface of said second auxiliary flap closed by a slide fastener, spaced eyelets in said second auxiliary flap opening into said last named pocket, resilient means disposed in said last named pocket, the eyelets in said auxiliary flaps, said side flaps and said front panel, the apertures in said rear panel and the rings on said top and bottom flaps being in alignment when said flaps are folded over a parachute and pilot chute, flexible means extending through said eyelets and apertures and engaging said resilient means and releasably engaging the rip cord assembly to releasably retain said flaps in folded condition and means on said pack for attaching the same to a parachute harness.

References Cited in the file of this patent

UNITED STATES PATENTS

| 1,627,067 | Russell | May 3, 1927 |
| 2,300,428 | Manson et al. | Nov. 3, 1942 |
| 2,482,693 | Rogers et al. | Sept. 20, 1949 |
| 2,717,133 | Gregory | Sept. 6, 1955 |
| 2,922,604 | Hatfield | Jan. 26, 1960 |

FOREIGN PATENTS

| 449,324 | Great Britain | June 22, 1936 |
| 649,569 | Germany | Aug. 25, 1937 |